United States Patent
Christensen

(10) Patent No.: US 8,950,532 B2
(45) Date of Patent: Feb. 10, 2015

(54) HUB REDUCTION GEAR AND DRIVELINE FOR A WHEELED VEHICLE AND MULTI-SHAFT WHEELED VEHICLE

(75) Inventor: Assar Christensen, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 524 days.

(21) Appl. No.: 13/124,086

(22) PCT Filed: Sep. 21, 2009

(86) PCT No.: PCT/SE2009/051044
§ 371 (c)(1),
(2), (4) Date: May 10, 2011

(87) PCT Pub. No.: WO2010/044722
PCT Pub. Date: Apr. 22, 2010

(65) Prior Publication Data
US 2011/0201472 A1    Aug. 18, 2011

(30) Foreign Application Priority Data
Oct. 14, 2008  (SE) ........................................ 0802192

(51) Int. Cl.
*B60K 17/02*    (2006.01)
*B60K 6/00*    (2006.01)
(Continued)

(52) U.S. Cl.
CPC ............... *B60K 17/046* (2013.01); *B60K 17/02* (2013.01); *B60K 17/36* (2013.01); *B60Y 2200/24* (2013.01); *F16H 3/54* (2013.01)
USPC ........................ 180/65.7; 180/65.51; 180/65.6

(58) Field of Classification Search
USPC ............. 180/65.51, 65.6, 65.7; 475/269, 286, 475/317, 323
See application file for complete search history.

(56) References Cited

U.S. PATENT DOCUMENTS 2,618,175 A * 11/1952 Bruce ............................ 475/113
3,217,565 A * 11/1965 Dietrich ........................ 475/270

(Continued)

FOREIGN PATENT DOCUMENTS

EP    1331127 A2    7/2003
FR    2760502 A1    9/1998

(Continued)

OTHER PUBLICATIONS

International Search Report and Written Opinion received for PCT Patent Application No. PCT/SE2009/051044, mailed on Jan. 13, 2010, 10 pages.

(Continued)

*Primary Examiner* — J. Allen Shriver, II
*Assistant Examiner* — Travis Coolman
(74) *Attorney, Agent, or Firm* — Morrison & Foerster LLP

(57) ABSTRACT

The invention relates to a hub reduction gear (10) for a driving wheel (20) of a wheeled vehicle with a planetary gear unit, which has a sun gear (12) connectable to a drive shaft (38*a*, 38*b*), a carrier (14) for planet gears (16), which are in mesh with the sun gear (12), and a ring gear (18) being in mesh with the planet gears (16). The planet gear carrier (16) and the ring gear (18) are configured to be alternately connected to the driving wheels (20) of the vehicle and being alternately connectable to a body-fixed part (24). The invention also relates to a driveline for a multi shaft, wheel supported vehicle with a hub reduction gear (10) of planetary gear type at the driving wheels of the vehicle, wherein the planet gear carrier and the ring gear of the planetary gears on at least one side of the vehicle are configured to be alternately connected to the driving wheels of the vehicle and being alternately connectable to a body-fixed part of the vehicle.

19 Claims, 2 Drawing Sheets

(51) Int. Cl.
*B60K 17/04* (2006.01)
*B60K 17/36* (2006.01)
*F16H 3/54* (2006.01)

(56) References Cited

U.S. PATENT DOCUMENTS

| | | | |
|---|---|---|---|
| 3,566,825 A | 3/1971 | Ruf | |
| 4,350,190 A * | 9/1982 | McColl | 144/4.1 |
| 5,049,116 A * | 9/1991 | Asada | 475/269 |
| 5,390,347 A * | 2/1995 | Buri et al. | 475/303 |
| 6,979,275 B2 * | 12/2005 | Hiraku et al. | 475/214 |
| RE39,179 E * | 7/2006 | Naunheimer et al. | 475/5 |
| 7,090,608 B2 * | 8/2006 | Han | 475/144 |
| 7,267,627 B2 * | 9/2007 | Mohan et al. | 475/221 |
| 7,845,445 B2 * | 12/2010 | Cooper et al. | 180/65.51 |
| 8,137,233 B2 * | 3/2012 | Carey et al. | 475/286 |
| 8,167,752 B2 * | 5/2012 | Houle | 475/5 |
| 8,376,885 B2 * | 2/2013 | Clauson | 475/5 |
| 8,506,441 B2 * | 8/2013 | Hultgren | 475/231 |
| 2002/0035003 A1 * | 3/2002 | Brown et al. | 475/317 |
| 2002/0119860 A1 | 8/2002 | Strong et al. | |
| 2004/0116234 A1 * | 6/2004 | Han | 475/221 |
| 2004/0248693 A1 * | 12/2004 | Korner et al. | 475/269 |
| 2005/0205329 A1 * | 9/2005 | Fanger-Vexler | 180/234 |
| 2006/0116233 A1 * | 6/2006 | Gradu | 475/276 |
| 2007/0107960 A1 * | 5/2007 | Takami et al. | 180/65.6 |
| 2010/0227732 A1 * | 9/2010 | Pederson | 475/284 |

FOREIGN PATENT DOCUMENTS

| | | |
|---|---|---|
| GB | 2089741 A | 6/1982 |
| KR | 2002-0013364 A | 2/2002 |
| WO | 03/022615 A1 | 3/2003 |
| WO | 2007/091963 A1 | 8/2007 |

OTHER PUBLICATIONS

Office Action Received for Chinese Patent Application No. 200980140644.8, mailed on Mar. 5, 2014, 15 pages (9 pages of English Translation and 6 pages of Official Copy).

Office Action received for Chinese Patent Application No. 200980140644.8, mailed on May 6, 2013, 17 pages (9 pages of English Translation and 8 pages of Office Action).

International Preliminary Report on Patentability received for PCT Patent Application No. PCT/SE2009/051044, mailed on Apr. 28, 2011, 7 pages.

Notification of the Third Office Action dated Nov. 15, 2014, directed to CN Application No. 200980140644.8; 8 pages.

* cited by examiner

HUB REDUCTION GEAR AND DRIVELINE FOR A WHEELED VEHICLE AND MULTI-SHAFT WHEELED VEHICLE

CROSS REFERENCE TO RELATED APPLICATIONS

This application is a U.S. National phase patent application of PCT/SE2009/051044, filed Sep. 21, 2009, which claims priority to Swedish patent application Serial No. 0802192-5, filed Oct. 14, 2008, all of which are hereby incorporated by reference in the present disclosure in their entirety.

BACKGROUND OF THE INVENTION

1. Technical Field

The present invention relates to a hub reduction gear for a driving wheel of heavy wheeled vehicles, such as military combat vehicles, which gear comprises a planetary gear unit having a sun gear connectable to a drive shaft, a carrier for planet gears, which are in mesh with the sun gear, and a ring gear surrounding the planet gears, said ring gear being in mesh with the planet gears.

2. Background Art

In order to facilitate a very narrow turn, a so called centre or pivot turn, of multiple shaft, wheel supported motor vehicles with drive on several shafts, i.e. bring the vehicle to turn on spot about its mainly vertical centre axis, it has earlier been suggested to use separate drivelines for the left and right driving wheel of the vehicle, such that the left and right driving wheels may be brought to rotate in mutually opposite rotational directions during turn. This system is constructively circumstantial, heavy and expensive and requires a large space in the vehicle.

Another known suggestion for providing mutually opposite rotational directions of the left and right drive shafts of multi shaft, wheel supported motor vehicles and thereby with a centre turn of the vehicle utilizes for each shaft pair a separate controllable, rotational reversing gear between a respective differential and drive shaft on the side of the vehicle. This makes the construction relatively space requiring in the transversal direction of the vehicle.

WO 2007/091963 describes a differential gear being constructed to, apart from the two conventional drive modes "open differential", i.e. that the output drive shafts from the differential rotate in the same direction with the possibility to rotate with the same rotational speed, and "locked differential", i.e. when the drive shafts rotate forcibly with the same rotational speed and in the same direction, also be able to provide the additional drive mode "rotation of drive shafts in opposite directions". This differential gear facilitates to also provide mutually opposite rotational directions of the drive shafts on the left and right side of the vehicle without any separate directional reversing extra gear and thereby a centre turn of the same.

It is further known to build in a hub reduction gear in respective driving wheel of wheel supported, multi shaft motor vehicle in order to provide a desired gear reduction of the rotational speed of the drive shaft to the driving wheels. Such hub reduction gears normally comprises a planetary gear unit having a sun gear connectable to each drive shaft, a carrier for planet gears, which meshes with the sun gear, and a ring gear surrounding the planet gears which meshes with the planet gears. Normally the carrier of the planet gears is permanently fixedly engaged to a part connectable to the wheel rim, while the ring gear is firmly fixed relative to the vehicle body.

SUMMARY OF THE INVENTION

It is an objective of the present invention to further develop a hub reduction gear of the above mentioned kind in such a way that the rotational direction of the driving wheel connected to the hub reduction gear may be reversed in a simple way without the need of any additional gear. For this purpose the hub reduction gear stated by way of introduction is distinguished by the features recited in the independent claim 1.

In its widest scope the carrier of the planet gears and the ring gear are configured to be alternately connected to the driving wheels of the vehicle and is alternately connectable to a body-fixed part of the vehicle. Hereby a pivot or centre turn, i.e. the driving wheels on one side of the vehicle rotate in opposite direction to the driving wheels on the other side of the vehicle, may easily be provided when the driving wheels on at least one side of the vehicle are equipped with such hub reduction gears, such that a turn of the vehicle may be done about the substantially central, vertical centre axis of the vehicle.

In a specially preferred embodiment of the hub reduction gear according to the invention the carrier of the planet gears is fixedly connectable to the driving wheel of the vehicle by means of a first engagable and disengagable clutch and engagably and disengagably connected to the body-fixed part of the vehicle by means of a second engagable and disengagable clutch, while the ring gear is fixedly connectable to the driving wheel of the vehicle by means of a third engagable and disengagable clutch and engagably and disengagably connected to the body-fixed part of the vehicle by means of a fourth engagable and disengagable clutch, wherein the first and fourth clutches are arranged to be engaged when the second and third clutches are disengaged and vice versa.

All clutches are suitable constituted by claw clutches, which may be electrically, pneumatically or hydraulically controllable between their engaged and disengaged positions.

According to independent claim 5 the invention relates to a drive line for a multi shaft, wheel supported vehicle with drive on the wheels on several shafts, the drive line comprising at least one driving motor, a transmission connected to the driving motor, an output shaft from the transmission, wherein a differential with an output left and right drive shaft is coordinated with each wheel shaft and the differentials being mutually connected by means of cardan shaft sections, and a hub reduction gear in each driving vehicle wheel with a planetary gear unit integrated therein, each planetary gear unit comprising a sun gear connected to each drive shaft, a carrier for planet gear, which mesh with the sun gear, and a ring gear surrounding the planet gears, which meshes with the planet gears, wherein the carrier of the planet gears and the ring gear on at least one side of the vehicle is configured to be alternately connected to the driving wheel of the vehicle and being alternately connectable to a body-fixed part of the vehicle. In order to provide a pivot turn with the solution according to the invention it is thus sufficient to have hub reduction gears according to the invention on only one side of the vehicle. The rotational direction of the pivot turn may be chosen by controlling the output drive of the gear box forward or backward.

The hub reduction gears are suitably formed at the driveline such that the carrier of the planet gears is fixedly connectable to the driving wheel of the vehicle by means of a first engagable and disengagable clutch and engagably and disengagably connected to the body-fixed part of the vehicle by means of a second engagable and disengagable clutch, while the ring gear is fixedly connectable to the driving wheel of the vehicle by means of a third engagable and disengagable clutch and engagably and disengagably connected to the body-fixed part of the vehicle by means of a fourth engagable and disengagable clutch, wherein the first and fourth clutches are arranged to be engaged when the second and third clutches are disengaged and vice versa.

Naturally the driveline may, if so desired, by configured such that the driving wheels on both sides of the vehicle are provided with hub reduction gears according to the invention.

It is advantageous in order to optimize the turning movement of the vehicle and passability during normal drive for the driving wheels on at least the front and back wheel shafts to be steerable.

The invention also comprises a multi shaft, wheel supported vehicle with drive on the wheels on several shafts, the vehicle comprising a driveline according to any of claims 5-8. The vehicle has at least three shafts, wherein at least the wheels on the front and back shafts are steerable.

Further details and advantages with the invention will be apparent with reference to appended drawings.

DETAILED DESCRIPTION OF PREFERRED EMBODIMENTS

Figure 1:
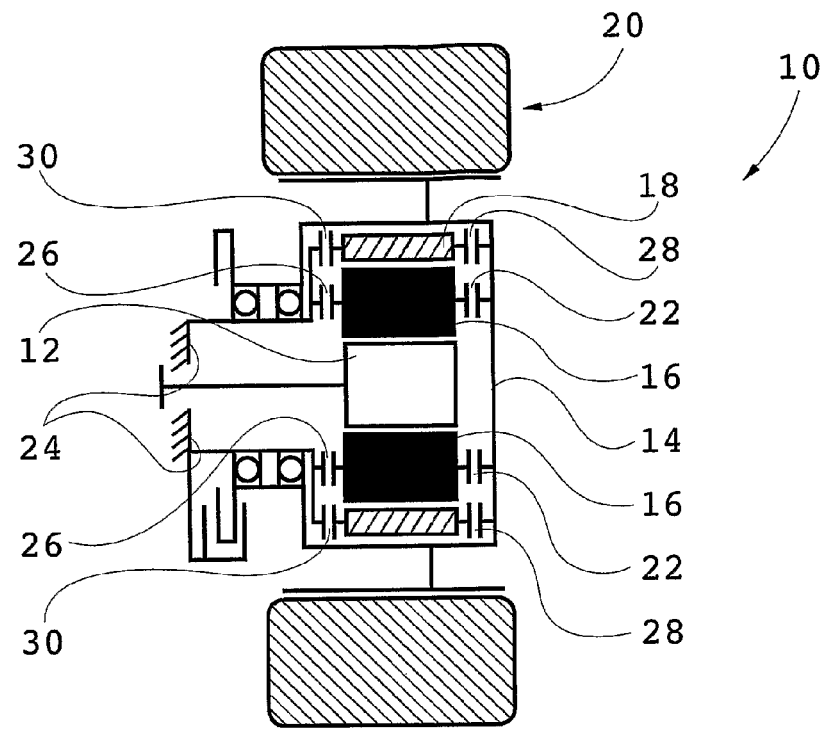
FIG. 1 is a schematic explanatory sketch of a hub reduction gear according to the invention.
Figure 2:
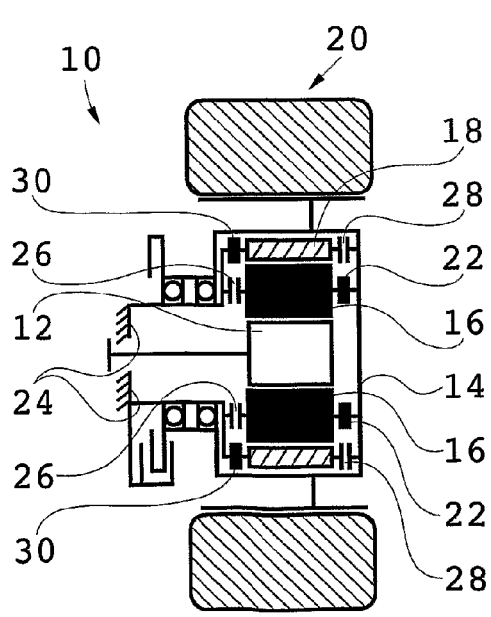
FIG. 2 shows a normal drive mode of the hub reduction gear in FIG. 1.
Figure 3:
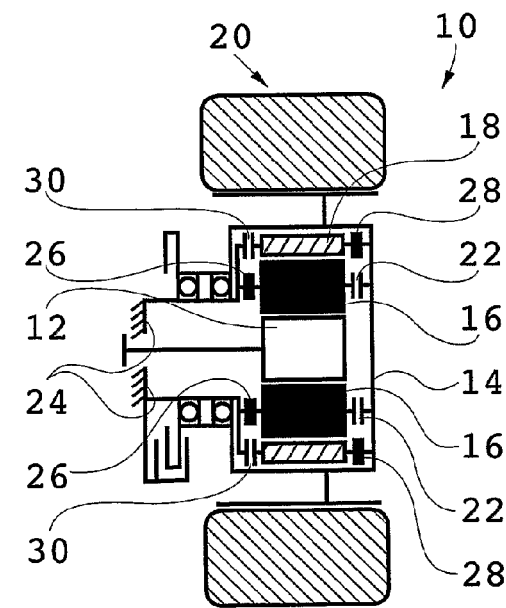
FIG. 3 shows a drive mode of the hub reduction gear during pivot turn of the vehicle.

In FIG. 1-3 is a schematically showed hub reduction gear for multi shaft, wheel supported vehicles generally denoted with 10. The hub reduction gear 10 comprises in a known way a planetary gear with a central sun gear 12 connected thereto and with a thereto belonging drive shaft (not shown), a carrier 14 for a plurality of planet gears 16 being in mesh with the sun gear 12, and ring gear 18, surrounding the planet gears 16 and being in mesh internally with these. According to the invention the planet gear carrier 14 is fixedly connectable to the driving wheel 20 of the vehicle by means of a first engagable and disengagable clutch 22 and engagably and disengagably connected to the body-fixed part 24 of the vehicle by means of a second engagable and disengagable clutch 26. Further the ring gear 18 is likewise fixedly connectable to the driving wheel 20 of the vehicle by means of a third engagable and disengagable clutch 28 and engagably and disengagably connected to the body-fixed part 24 of the vehicle by means of a fourth engagable and disengagable clutch. The clutches 22, 26, 28 and 30 may be claw clutches being electrically, pneumatically or hydraulically controllable between their engaged and disengaged positions.

In FIG. 2 the hub reduction gear 10 is shown in a normal drive mode for driving of the vehicle forward (or backward), wherein the planet gear carrier 14 is fixedly connected to the driving wheel 20 via an engaged first clutch 22 and disengaged to the body-fixed part 24 via the second clutch 26, at the same time as the third clutch 28 is disengaged and the fourth clutch 30 is engaged, such that the ring gear 18 is held locked to the body-fixed part 24 and disengaged to the driving wheel 20.

Figure 4:
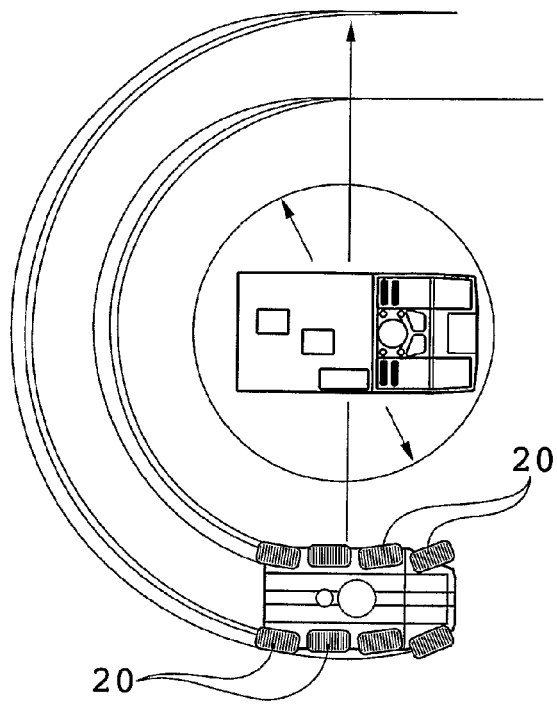
FIG. 4 shows a schematic plan view of a four wheeled vehicle, performing a pivot turn as well as a curve turn.

In order to facilitate a pivot turn of a wheeled vehicle, i.e. a turning of the vehicle about its substantially vertical centre axis, such as schematically shown in the middle of FIG. 4, the driving wheels 20 on one side of the vehicle need to be brought to rotate in the opposite direction to the driving wheels 20 on the other side of the vehicle. This may be achieved, as shown in FIG. 3, by reversing the engaging positions of the clutches 22, 26, 28 and 30 in the hub reduction gears 10 on one side of the vehicle in relation to the ones shown in FIG. 2. Thus, the clutches 22, 30 are kept disengaged, while the clutches 26, 28 are kept engaged, wherein the planet gear carrier 14 is locked to the body-fixed part 24 and the ring gear 18 is fixedly connected to the ring gear 20.

Figure 5:
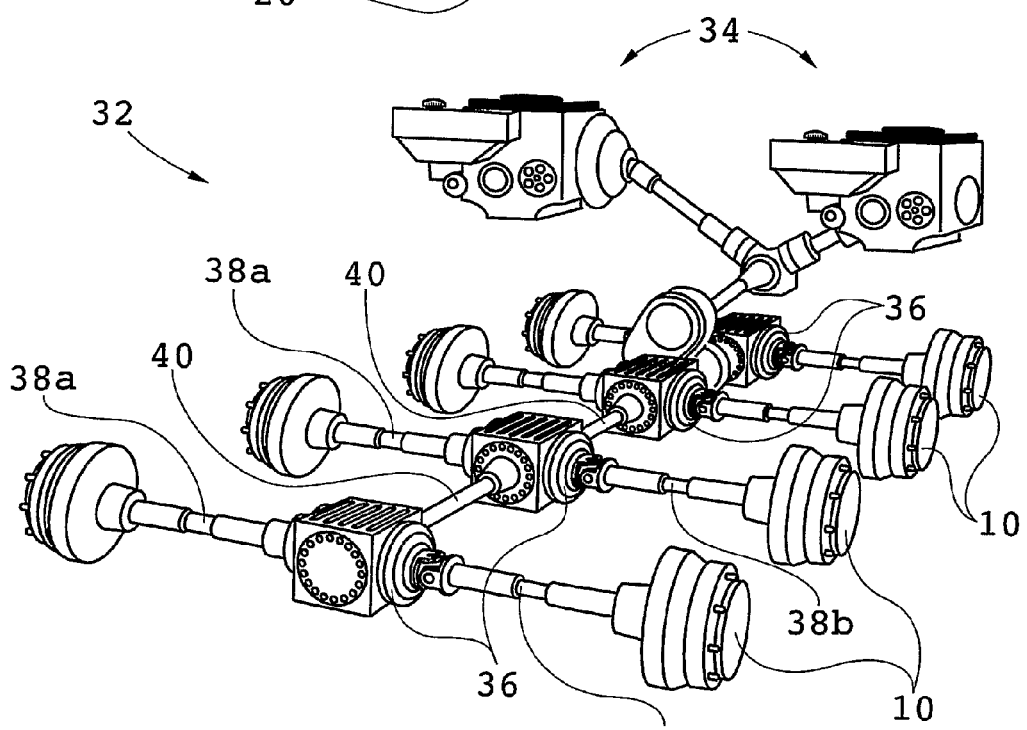
FIG. 5 shows an example of a drive line for a four wheeled vehicle according to the invention.

In FIG. 5 a driveline 32 for a heavy, four shaft wheeled vehicle is schematically shown. The driveline 32 includes in this case two driving motors 34 of arbitrary type, e.g. combustion engines of diesel type, conventional differentials 36 with output shafts 38a, 38b, being connected to respective sun gears 12 (FIG. 1-3) of hub reduction gears 10 on left and right side of the vehicle and being mutually connected via cardan shaft sections 40. In order to be able to perform a pivot turn of the vehicle, only the hub reduction gears 10 on one side of the vehicle needs to be designed in accordance with the invention, i.e. with engagable and disengagable clutches 22, 26, 28, 30, while the hub reduction gears on the other side of the vehicle side may be of conventional type, lacking such disengagable clutches.

It is suitable that the driving wheels 20 on at least the front and rear shafts of the vehicle are controllable in order to improve the manoeuvrability of the vehicle on road and in terrain. In the example in FIGS. 3 and 4 the driving wheels on the front shafts are controllable as well as the ones on the rear shaft.

The invention claimed is:

1. Hub reduction gear for a driving wheel of a wheeled vehicle, comprising:
   a planetary gear unit comprising:
      a sun gear connectable to a drive shaft,
      a carrier for planet gears, which are in mesh with the sun gear, and
      a ring gear being in mesh with the planet gears,
   wherein the carrier and the ring gear are each configured to be connected to and disconnected from each of the driving wheel and a body-fixed part,
   wherein the carrier is fixedly connectable to the driving wheel of the vehicle by means of a first engagable and disengagable clutch and engagably and disengagably connected to the body-fixed part of the vehicle by means of a second engagable and disengagable clutch,
   wherein the ring gear is fixedly connectable to the driving wheel of the vehicle by means of a third engagable and disengagable clutch and engagably and disengagably connected to the body-fixed part of the vehicle by means of a fourth engagable and disengagable clutch,
   wherein the first and fourth clutches are arranged to be engaged when the second and third clutches are disengaged and vice versa, and
   wherein all clutches are electrically, pneumatically or hydraulically controllable between their engaged and disengaged positions.

2. Hub reduction gear according to claim 1, wherein the carrier is disconnected from the driving wheel and connected to the body-fixed part, wherein the ring gear is connected to the driving wheel and disconnected from the body-fixed part, and wherein the ring gear rotates the driving wheel in a forward direction.

3. Hub reduction gear according to claim 1, wherein all clutches are constituted by claw clutches.

4. Hub reduction gear according to claim 1, wherein the carrier is connected to the driving wheel and disconnected from the body-fixed part, wherein the ring gear is disconnected from the driving wheel and connected to the body-fixed part, and wherein the carrier rotates the driving wheel in a forward direction.

5. Hub reduction gear according to claim 1, wherein the carrier is disconnected from the driving wheel and connected to the body-fixed part, wherein the ring gear is connected to the driving wheel and disconnected from the body-fixed part, and wherein the ring gear rotates the driving wheel in a backward direction.

6. Hub reduction gear according to claim 1, wherein the carrier is connected to the driving wheel and disconnected from the body-fixed part, wherein the ring gear is disconnected from the driving wheel and connected to the body-fixed part, and wherein the carrier rotates the driving wheel in a backward direction.

7. Driveline for a multi shaft wheel supported vehicle with drive on wheels on several shafts, comprising:
  at least one driving motor,
  a transmission connected to the driving motor,
  an output shaft from the transmission, wherein each wheel shaft is co-ordinated to a differential with output left and right drive shaft and the differentials being mutually connected by means of a cardan shaft section, and
  a hub reduction gear in each driving wheel with a planetary gear unit integrated therein, each planetary gear unit comprising:
    a sun gear connected to a respective drive shaft,
    a carrier for planet gears, which mesh with the sun gear, and
    a ring gear surrounding the planet gears, said ring gear being in mesh with the planet gears,
  wherein the carrier and the ring gear of the planetary gear units on at least one side of the vehicle are configured to be connected to and disconnected from each of the respective driving wheel and a body-fixed part,
  wherein the carrier is fixedly connectable to the driving wheel of the vehicle by means of a first engagable and disengagable clutch and engagably and disengagably connected to the body-fixed part of the vehicle by means of a second engagable and disengagable clutch,
  wherein the ring gear is fixedly connectable to the driving wheel of the vehicle by means of a third engagable and disengagable clutch and engagably and disengagably connected to the body-fixed part of the vehicle by means of a fourth engagable and disengagable clutch,
  wherein the first and fourth clutches are arranged to be engaged when the second and third clutches are disengaged and vice versa, and
  wherein all clutches are electrically, pneumatically or hydraulically controllable between their engaged and disengaged positions.

8. Multi shaft, wheel supported vehicle with drive on the wheels on several shafts, comprising a driveline according to claim 7.

9. Multi shaft, wheel supported vehicle according to claim 8, comprising at least three shafts, wherein at least the wheels on the front and rear shafts are steerable.

10. Multi shaft, wheel supported vehicle according to claim 8, wherein the carrier is connected to the respective driving wheel and disconnected from the body-fixed part, wherein the ring gear is disconnected from the respective driving wheel and connected to the body-fixed part, and wherein the carrier rotates the respective driving wheel in a forward direction.

11. Multi shaft, wheel supported vehicle according to claim 8, wherein the carrier is disconnected from the respective driving wheel and connected to the body-fixed part, wherein the ring gear is connected to the respective driving wheel and disconnected from the body-fixed part, and wherein the ring gear rotates the respective driving wheel in a backward direction.

12. Multi shaft, wheel supported vehicle according to claim 8, wherein the carrier is connected to the respective driving wheel and disconnected from the body-fixed part, wherein the ring gear is disconnected from the respective driving wheel and connected to the body-fixed part, and wherein the carrier rotates the respective driving wheel in a backward direction.

13. Multi shaft, wheel supported vehicle according to claim 8, wherein the carrier is disconnected from the respective driving wheel and connected to the body-fixed part, wherein the ring gear is connected to the respective driving wheel and disconnected from the body-fixed part, and wherein the ring gear rotates the respective driving wheel in a forward direction.

14. Driveline according to claim 7, wherein the carrier and the ring gear of the planetary gear units on both sides of the vehicle are configured to be connected to and disconnected from each of the respective driving wheel and a body-fixed part.

15. Driveline according to claim 7, wherein the wheel shafts include front and rear shafts each having a driving wheel, and wherein the driving wheels on at least the front and rear shafts are steerable.

16. Driveline according to claim 7, wherein the carrier is disconnected from the respective driving wheel and connected to the body-fixed part, wherein the ring gear is connected to the respective driving wheel and disconnected from the body-fixed part, and wherein the ring gear rotates the respective driving wheel in a backward direction.

17. Driveline according to claim 7, wherein the carrier is connected to the respective driving wheel and disconnected from the body-fixed part, wherein the ring gear is disconnected from the respective driving wheel and connected to the body-fixed part, and wherein the carrier rotates the respective driving wheel in a backward direction.

18. Driveline according to claim 7, wherein the carrier is disconnected from the respective driving wheel and connected to the body-fixed part, wherein the ring gear is connected to the respective driving wheel and disconnected from the body-fixed part, and wherein the ring gear rotates the respective driving wheel in a forward direction.

19. Driveline according to claim 7, wherein the carrier is connected to the respective driving wheel and disconnected from the body-fixed part, wherein the ring gear is disconnected from the respective driving wheel and connected to the body-fixed part, and wherein the carrier rotates the respective driving wheel in a forward direction.

* * * * *